United States Patent [19]

Ishikawa et al.

[11] Patent Number: 4,839,773

[45] Date of Patent: Jun. 13, 1989

[54] DIELECTRIC FILTER

[75] Inventors: Youhei Ishikawa, Kyoto; Kikuo Tsunoda, Yawata; Toshiro Hiratsuka; Hirotsugu Abe, both of Nagaokakyo, all of Japan

[73] Assignee: Murata Manufacturing Co., Ltd., Japan

[21] Appl. No.: 210,025

[22] Filed: Jun. 22, 1988

[30] Foreign Application Priority Data

Jun. 22, 1987 [JP] Japan ................................ 62-155115

May 26, 1988 [JP] Japan ............................ 63-69709[U]

[51] Int. Cl.[4] ......................... H01P 1/205; H01G 1/14

[52] U.S. Cl. ..................................... 361/321; 333/202

[58] Field of Search ................ 333/202, 203; 361/306, 361/321

[56] References Cited

U.S. PATENT DOCUMENTS 2,828,454 3/1958 Khouri ................................ 361/321

3,946,290 3/1976 Yoshioka et al. .................. 361/306

4,546,333 10/1985 Fukasawa et al. .................. 333/202

4,611,882 9/1986 Ushida ............................ 361/306 X 4,757,288 7/1988 West .............................. 333/202 X

*Primary Examiner*—Donald A. Griffin

*Attorney, Agent, or Firm*—Ostrolenk, Faber, Gerb & Soffen

[57] ABSTRACT

In a dielectric filter which has a plurality of dielectric resonators of a $TM_{010}$ mode or its modified mode, each dielectric resonator has one dielectric solid body disposed in series with a metallic case having top and bottom faces and at least one side face. A conductive film is provided to form the actual current paths on the surface of the ceramic case, and a conductive plate is provided between the dielectric resonators to electrically connect the resonators with each other, whereby a given electro-magnetic combination is caused between the adjacent dielectric resonators so as to provide a dielectric filter having given characteristics.

7 Claims, 5 Drawing Sheets

DIELECTRIC FILTER

BACKGROUND OF THE INVENTION

The present invention generally relates to a dielectric filter which has a plurality of dielectric resonators of a $TM_{010}$ mode or its modified mode.

Conventionally, in this type of dielectric filter, as shown in FIG. 16, a cavity case 54 is made entirely of ceramics, having a linear-expansion coefficient which is the same or substantially the same as that of the dielectric poles 52, the cavity case being accommodated within a metallic case (not shown). This prevents any deterioration of the temperature response characteristics through the combination of the ceramic cavity case 54 and the ceramic dielectric poles 52, since these have the same linear-expansion coefficient. The cavity case 54 has partitions 54a for adjusting the electro-magnetic coupling between the resonators and conductive films 56 for forming actual current paths thereon. If the cavity case were made of metal and the dielectric poles 52 were soldered to it, in addition to adversely affecting the temperature response characterstics, the Q of the resonator would be considerably lowered because of Joule loss in the solder portion.

However, in the conventional dielectric filter of FIG. 16, such a cavity case 54, as described hereinabove, which is entirely made of ceramics and has several stages of dielectric resonators, is required to have a size corresponding to the number of the stages of the resonators, with chambers being provided, made of ceramic plate. Therefore, as the case becomes larger, the assembling operation becomes more complex, and the assembling thereof becomes harder to perform. Also, larger ceramic plates are required to make the cavity case, and the material becomes more expensive, thus resulting in higher cost.

SUMMARY OF THE INVENTION

Accordingly, an object of the present invention is to provide an improved dielectric filter, which is a ceramic case having top, bottom faces and at least one side face. A dielectric resonator has one dielectric solid body disposed in the case, with conductive films being provided to form the actual current paths on the surface of the ceramic case. A plurality of the dielectric resonators are provided in series within a metallic case, and the conductive films of the adjacent dielectric resonators are electrically connected among them.

Another object of the present invention is to provide a dielectric filter, where given electro-magnetic coupling is caused between the adjacent dielectric resonators to have given characteristics.

A further object of the present invention is to provide a dielectric filter of the unit type, wherein the length of the current route between dielectric resonators that is provided by the conductive plate is arranged to be constant, so that uniform filter characteristics may be provided, and the stresses caused by the thermal expansion, contraction and so on of the conductive plate may be easily eliminated.

In accomplishing these and other objects, according to one preferred embodiment of the present invention, the dielectric resonator is provided as a unit and is accommodated in a metallic housing, so that the manufacturing operation is improved and the individual ceramic plates become unnecessary in accordance with the number of the stages, thus resulting in reasonable material expenditures.

In other preferred embodiments of the present invention, the dielectric filter is characterized in that notch portions are provided in the earth plate, and a portion of the earth plate with the notch portions in it is soldered on the conductive film of the surface of the electric resonator to connect the resonator with another adjacent dielectric resonator through the conductive plate. With notch portions in such an conductive plate in the embodiment, not only does the molten solder go around the end edge of the conductive plate to penetrate below a portion of the conductive plate, but also the molten solder penetrates below the conductive plate by passing through the notch portions. Thus, the solder positively penetrates below the conductive plate and can be visually inspected in the vicinity of the notch portions, whereby the path length of current flowing from one dielectric resonator to the other dielectric resonator through the conductive plate may be made constant, and the impedance between the dielectric resonators may be made constant without variation or dispersion between the various samples thereof, so as to provide equal filter characteristics. Also, the notch portions provided in the conductive plate increase the flexibility of the conductive plate, so when the conductive plate has been thermally expanded, contracted by variation in the temperature, or the like, the conductive plate is easily deformed to absorb the stresses to prevent the soldered portion from coming off or the conductive plate from being cut off.

BRIEF DESCRIPTION OF THE DRAWINGS

These and other objects and features of the present invention will become clear from the following description of preferred embodiments thereof, with reference to the accompanying drawings, in which.

DETAILED DESCRIPTION OF THE INVENTION

Figure 1:
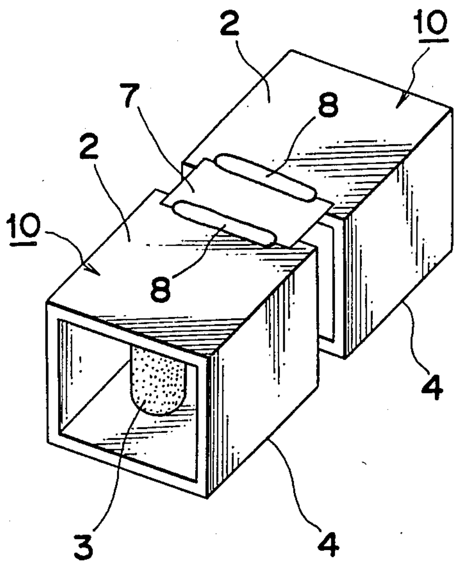
FIG. 1 is a perspective view of a resonator unit comprising two dielectric resonators in accordance with a first embodiment of the present invention.

Before the description of the present invention proceeds, it is to be noted that like parts are designated by like reference numerals throughout the accompanying drawings.

Referring now to FIGS. 1 to 5, in accordance with a first embodiment of the present invention, a dielectric filter 1 comprises a pair of resonators 10, 10. Each resonator 10 includes a ceramic case 4 which has a pair of openings at its two ends and has a conductive film 2, thereon to form an actual current path on the surface of the ceramic case 4. A dielectric solid body 3 which has the same characteristic of linear expansion coefficient as the ceramic case 4 is mounted and accommodated in the case 4. A metallic housing 11 accommodates the pair of resonators 10, 10 in series with each other while a space is left therebetween so as to produce a given coupling force between the two resonators 10, 10 in relationship with the amounts of the opening areas thereof facing each other. The metallic housing 11 also provides a pair of respective input and output terminals 12, 12 at its two ends. A conductive film plate 7 forms a connection between the ceramic cases 4, 4, which has physical characteristics (discussed below) capable of lessening the expansion and contraction stresses on the plate 7 due to heating and cooling so that any heating stresses of expansion and contraction which are generated between the ceramic cases 4, 4 and the metallic housing 11 can be eliminated by the conductive film plate 7.

Figure 3:
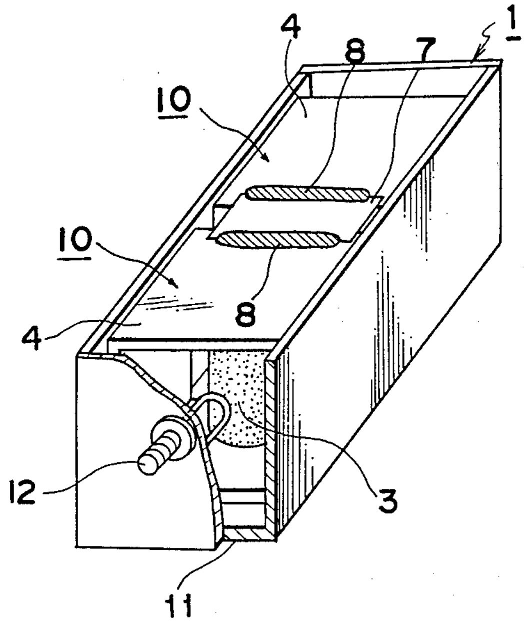
FIG. 3 is a perspective view of a dielectric filter employing the resonator unit of FIG. 1.

The dielectric filter 1, of which a cover plate is omitted in FIG. 3, is provided with the pair of resonators 10, 10 to form two reactor stages of the dielectric filter. The case 4 of the resonators is made of, for example, ceramics, and has a top plate, a bottom plate and two side plates, which define the openings surrounded by all the plates at the front and back ends. The conductive film 2 is made of, for example, silver and is formed by a silver-baking operation on the entire surfaces of the cases 4, whereby an actual current path is provided by the conductive film 2 on the surface of the case 4. The dielectric solid body 3 is made of ceramic, which is the same materials as to the case 4, and stands within the case like a pillar to constitute a resonator of a $TM_{010}$. The both ends of the dielectric solid body 3 are secured onto the inner surfaces of the top and bottom plates of the case 4 by means of silver paste being applied therebetween. In a resonator of a TE mode the dielectric solid body is provided on the case through an insulating element in a known manner. The metallic housing 11 includes a container having a cross-section of U-shape, a cover plate, a front plate and a rear plate, all plates being mounted on the container to form a box for accommodating the resonators therein. The front and rear plates provide respectively the input and output terminals 12, 12 each including a connector pin fixed on the plate and a metal wire having a loop shape of which one end is connected to the connector pin and the other end is grounded to the metallic housing 11. Within the metallic housing 11, the pair of resonators are provided in a line in series, with a space therebetween of which the dimension is determined as a function of the amounts of the opening areas of the ceramic cases 4, 4 facing each other, to be produce a given coupling force between the two resonators. The conductive film plate 7 is made of, for example, phosphor bronze, and is formed of a thin film layer having a thickness of 0.1 mm, which has a property to be able to lessen the heating stress of expansion and contraction of itself. Both ends of the conductive film 2 are bonded on the surfaces of the cases 4, 4 so as to connect electrically and mechanically, through the conductive film plate 7 the pair of cases 4, 4 mounted on the metallic housing 11, to thereby provide a dielectric filter 1 of two resonator stages.

Figure 4:
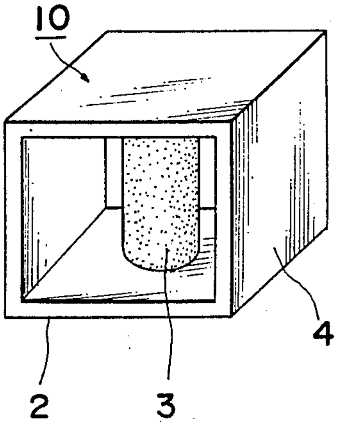
FIG. 4 is a perspective view of one of the resonators of FIG. 1.

Each of the resonators 10 has the dielectric solid body 3 disposed within the case 4, as shown in FIG. 4, and secured at both its ends to the inner surface of the case 4 whose linear expansion coefficient property is the same as that of the dielectric solid body 3, and is provided with the conductive film 2 of silver formed on the surface of the case to form an actual current path thereon. The plurality of resonators 4 are arranged, as shown in FIG. 1, with a given spacing, and the conductive film plates 7 are respectively bridged between the top faces and the lower faces of the adjacent resonators 4, with both the end portions of each of the plates 7 being soldered on the conductive film 2 of the resonator 4. The conductive film 2 of the resonators 4 are combined to each other to form one unit through the plates 7 so as to cause the given electromagnetic coupling between the adjacent resonators 4. In the actual filter construction, the unit of the resonators 4 is further accommodated within the metallic case 11, which is provided with the input and output terminals to be connected with external devices.

Accordingly, the plates 7 are provided between the surfaces of a plurality of resonators 4 arranged at given intervals, with both the end portions of each plate 7 being soldered to the conductive film 2, so that the dielectric filter of the desired number of stages is provided with a blind-plate shaped leaf which is free from holes, notches or the like being used as the plate 7. Also, when the soldering operation is effected with the solder 8 being adhered to the end portion of the plate 7, the molten solder penetrates into a gap between the under face of the plate 7 and the outer surface of the case 1 from the end of the plate 7, so that the resonators 4 are each electrically connected with the plate 7 by the solder 8, as shown in FIG. 2.

Figure 2:
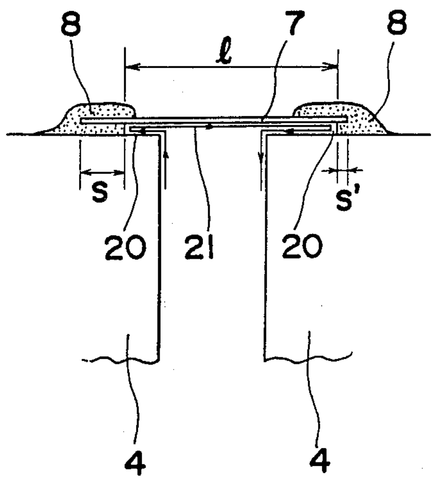
FIG. 2 is a cross-sectional view, on an enlarged scale, of a portion of FIG. 1.

However, if the solder 8 does not fully penetrate into the recess (gap), a non-contact portion 20 is caused to exist between the plate 7 and the conductive film 2, in that the plate 7 floats slightly due to the penetration of the solder 8, so that the conductive current flowing from one resonator 4 to the other resonator 4 through the plate 7 goes a long way round, following the route the (conductive film 2→the solder 8→the plate 7 under face→the solder 8→the conducive film 2) indicated by an arrow 21 in FIG. 2. Even in this situation, the gaps 20 do not matter when the space l between the two solder portions 8 the ends of the plate 7 is constant, and the route length along which the conductive current flows is constant. But, if the dispersion or variation in the route length is large, as for example in FIG. 2, wherein the route length is varied according to the varying penetration depth S or S' of the solder 8, such dispersion causes a corresponding dispersion of the impedance between the resonators. Also, if the plate 7 is simply floated slightly in the non-contact portion 20, the degree of insulation or contact between the plate 7 and the conductive film 2 is uncertain, which causes the plate 7 and the conductive film 2 to be unstable as regards the electrical conductive condition in this portion. In the actual filter construction an additional problem is that it is hard to see, the adhering condition of the solder 8 because of the existence of the metallic housing 11.

As the plate 7 is comparatively high in hardness in terms of blind-plate shape and is hard to change in shape, it is feared that heating stress can be caused in the plate 7 and the solder portion when the plate 7 of the metallic leaf is thermally expanded or contracted due to existing the temperature variation thereof.

In FIG. 3, a plurality of resonators 10 are provided in series within the metallic housing 11, and the plates 7 of silver sheet like metallic leaf are suspended between the resonators 10 and soldered by the solder 8 so that the resonators 10 are electrically connected together to constitute the multistage dielectric filter 1.

Figure 5:
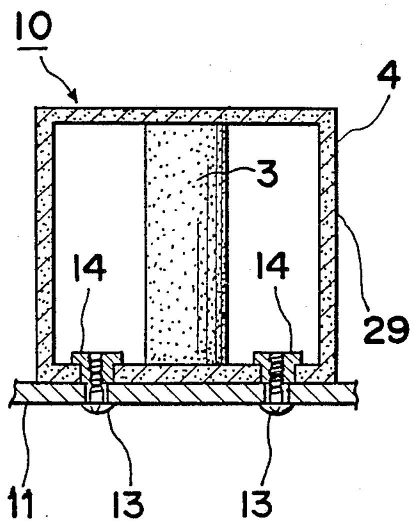
FIG. 5 is a cross-sectional view of the filter of FIG. 3.

To secure each of resonators 10 to the metallic housing 11, screws 13 and nuts 14 are used, as shown in FIG. 5, to effect the clamping operation.

Figure 6:
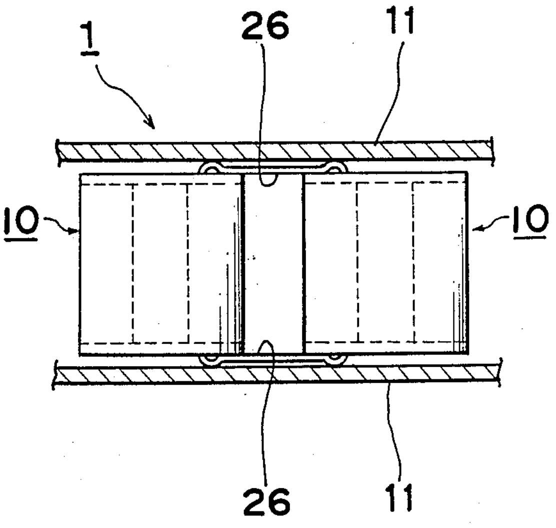
FIG. 6 is a front view showing a further modification of the filter of FIG. 3.

In a modified embodiment as shown in FIG. 6, in order to mount the resonators 10 within the metallic housing 11, metallic-plate springs 26 may be employed in place of the plate and the screws and nuts, which is respectively inserted between the dielectric resonators 10 and the metallic housing 11, as shown in FIG. 6, to connect electrically the resonators 10 and to fix mechanically the resonators 10 onto the metallic housing 11.

Figure 7:
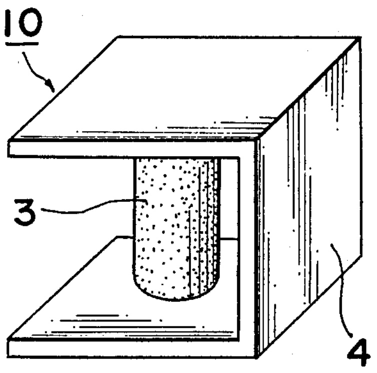
FIG. 7 is a perspective view showing a modification of the resonator of FIG. 4.

Also, the side plates of the ceramic case 4 constituting the dielectric resonator 10 are not always required to be two in number as described hereinabove, and may be one in number when the case is to be located in the corner of the housing, as shown in FIG. 7.

Figure 8:
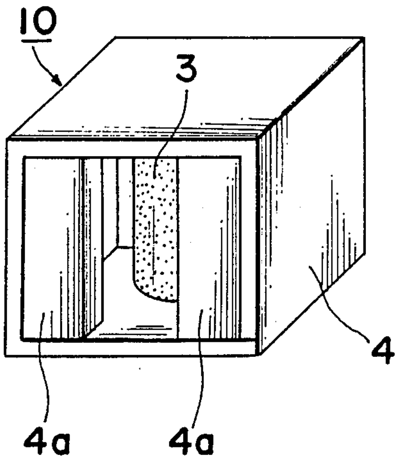
FIG. 8 is a perspective view showing another modification of the resonator of FIG. 4.

Also, bulkhead plates 4*a* of any type may be provided, as shown in FIG. 8, on the resonator 10 in order to reduce the amount of the opening area for adjusting the electro-magnetic coupling to the adjacent resonator. The bulkhead plates 4*a* may be made of the same silver-baked ceramic plate as the ceramic case 4, or of metallic plates. Accordingly, the given electro-magnetic coupling is caused between the resonators 10 so as to provide a dielectric filter having the given characteristics.

The dielectric resonators 10 are provided as a unit within the metallic case 11, and the assembling operation is improved since a big ceramic plate is not required to be used as in the cavity case of conventional filter described above, and the material expenditure is also reduced, so that the assembling cost may be expected to be lowered.

In connection with the dielectric solid body 3 and the metallic housing 11, the actual current path is effectively formed of the conductive films 2, and the Q of the resonator is not lowered. Also, the conductive film 2 is not always required to be provided on the entire surface of the ceramic case 4, as described in the above embodiments, and it will do if at least the actual current path is formed of the conductive films on the surface of the case 4.

In addition, the sectional shape of the dielectric solid body 3, the shape of the case 4, and the number (namely, the stage number) of the resonators 10 provided in series within the metallic housing 11 may be changed. Also, the resonators 10 may be formed with a modified one of the $TM_{010}$ mode.

Referring to FIGS. 9 to 12, there is shown a dielectric filter of a $TM_{010}$ mode in accordance with a second embodiment of the present invention.

Figure 11:
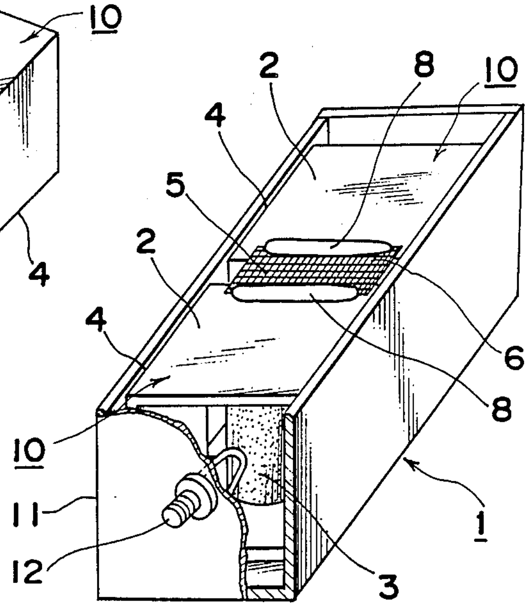
FIG. 11 is a perspective view of a dielectric filter employing the resonator unit of FIG. 9.
Figure 12:
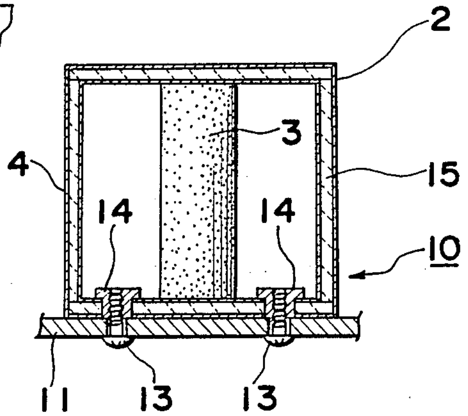
FIG. 12 is a cross-sectional view of the filter of FIG. 11.

In FIG. 11, wherein a portion corresponding to the top cover is not shown, a plurality of dielectric resonators 10 disposed within a metallic housing 11 with constant spacing are electrically connected by an earth plate 5 to construct a multi-stage dielectric filter 1. The fixing of each dielectric resonator 10 to the metallic housing 11 is effected by means of fasteners such as screws 13 and nuts 14, as shown in FIG. 12. The earth plate 5 is constructed to have the same characteristic as the conductive film plate 7 of the first embodiment. The dielectric resonators 10 of one unit shape are connected with each other through the earth plate 5, so that a dielectric filter 1 of a desired number of stages may be constructed to provide the desired filter characteristics of electro-magnetic coupling to be caused between the adjacent resonators 10.

Each of the dielectric resonators 10 has one inner dielectric solid body 3 disposed within the ceramic case 4 to construct a dielectric resonator of a $T_{010}$ mode. The case 4 is formed into a cylindrical shape by splicing the ceramic plate 15, with the front end and the rear end being open. The full surface of the ceramic plate (or at least the surface) has applied and baked silver paste to form a conductive film 2 which becomes an actual current passage. The front end and/or rear end opening may be partially covered with a similar metallic ceramic plate, so that the electro-magnetic coupling between the resonators may be adjusted as mentioned in the first embodiment. Also, the case 4 is formed into a square barrel by a ceiling plate, a bottom plate and both the side plates. Also, the case 4 may be constructed by the ceiling plate, the bottom plate and one side plate, and the side-peripheral three faces or four faces may be covered by other plates. The inner dielectric solid body 3 is formed of dielectric ceramic of high dielectric coefficient such as titanium oxide series or the like, with the top end and the bottom end being secured onto the inner surface of the case 4. To secure the inner dielectric solid body onto the inner wall face of the case 4, both of these may be integrally baked when the conductive film 2 is applied to the surface of the case 4 and the silver paste is applied to the top end face and the lower end face of the inner dielectric solid body 3, or an adhesion agent such as glass glaze or the like, may be employed therebetween. The case 4 is made of ceramic which is almost equal in linear expansion coefficient to the dielectric solid body 3 or is of the same material as the dielectric solid body 3, so that the both ends of the dielectric solid body 3 thus will not come off the case 4 because there is no difference in the linear expansion coefficient therebetween. Also, the dielectric solid body 3, which is cylindrical in the drawings, may be a square pillar. The case 4 may be formed by being molded integrally with the dielectric solid body 3.

Figure 15:
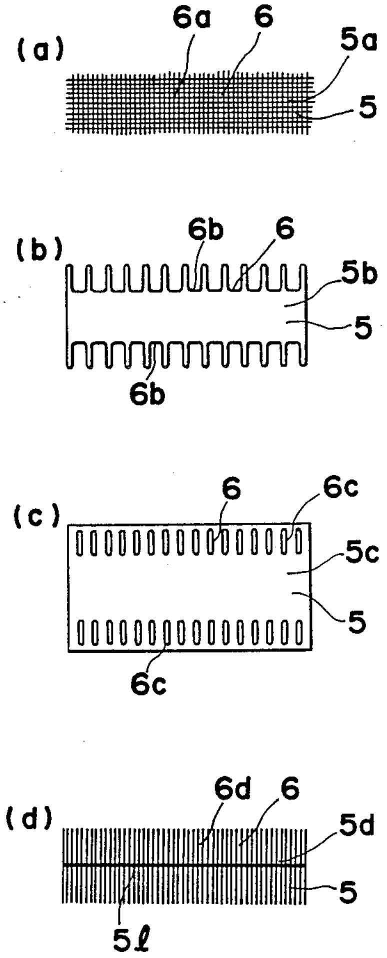
FIGS. 15 (*a*) to (*d*) are schematic plan views showing respective modifications of a conductive plate to be employed in the resonator unit.
Figure 16:
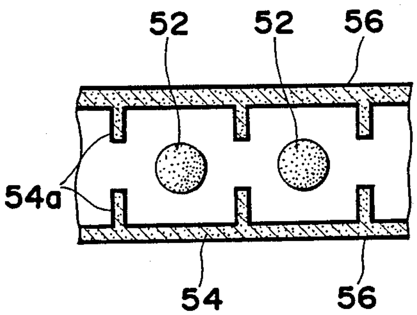
Fig. 16 PRIOR ART
FIG. 16 is a cross sectional view of a conventional dielectric filter (already referred to).

The earth plate 5 which connects one dielectric resonator 10 with the other dielectric resonator 10 is not a blind plate in shape, but has notch portions 6 in at least both its end-edge portions. As examples of the earth plate 5 which has notch portions 6 provided therein, there can be used a mesh 5*a* which has mesh holes 6*a*, as shown in FIG. 15(*a*), a metallic leaf 5*b* which has groove-shaped notches 6*b* of constant depth provided in the end edge portion, as shown in FIG. 15(*b*), a metallic leaf 5*c* which has long holes 6*c* of the same length drilled in the end edge portion, as shown in FIG. 15(*c*), and parallel metallic wire rods 5d, which are arranged when seen face on to have a space 6d formed between the metallic wire rods 5d as shown in FIG. 15(*d*). In the latter case, a wire rod which couples the other metallic wire rods 5d to the metallic wire rod 5d may be provided. Also, in the metallic leaf 5c (FIG. 15(*c*)), the long holes 6c may be formed in the longitudinal direction to be suspended between the portions close to the both ends of the earth plate 5.

Figure 9:
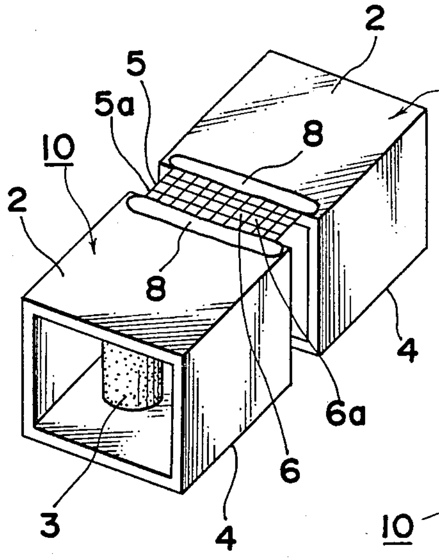
FIG. 9 is a perspective view of a unit of dielectric resonators in accordance with a second embodiment of the present invention.
Figure 10:
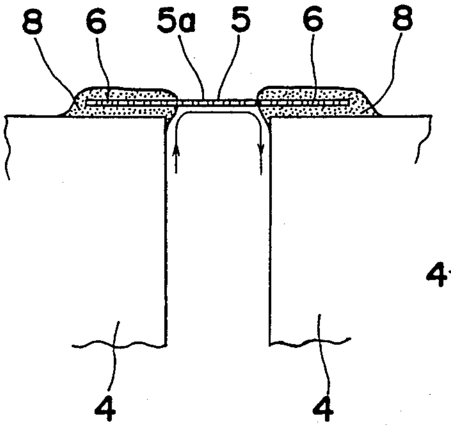
FIG. 10 is a cross-sectional view, on an enlarged scale, of a portion of FIG. 9.

In the embodiment of FIG. 9, a mesh-shaped earth plate 5 as shown in FIG. 15(*a*) is used, but meshes knitted with the metallic wire rods may also be used which have much finer meshes than the meshes illustrated. When the resonators 10 are coupled by the earth plate 5, the resonators 10 are placed at a given interval with the openings being oppositely placed, and the earth plate is placed across the gaps between the surfaces of the resonators 10. Then, solder cream is applied to both the ends of the earth plate 5, and the solder cream is heated to cause reflowing to solder the earth plate 5 to the conductive film 2 of the case 4. During the solder reflowing operation, the molten solder 8 goes around the end edge of the earth plate 5 to penetrate not only below the earth plate 5, but also onto the bottom face of the conductive plate if it passes through the meshy holes 6a of the earth plate 5, with the result that the solder 8 may positively penetrate so far as the end of the case 4 as shown in FIG. 10, so that the route of the conductive current from one dielectric resonator 10 to the other dielectric resonator 10 through the earth plate 5 becomes the shortest distance, as shown by the arrow 16 in FIG. 14. Accordingly the route length becomes constant and the space between the dielectric resonators 10 becomes also constant. Moreover, the penetration of the solder 8 positively, as far as the end of the base 4 in this manner, removes the unstable contact portion between the earth plate 5 and the conductive film 2, to reduce any noise caused thereby, thus resulting in the filter being superior in this sense as well.

Figure 13:
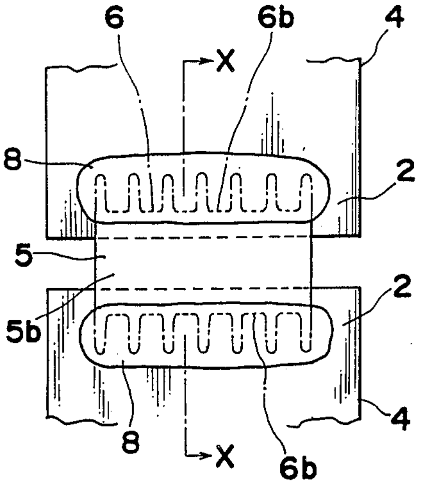
FIG. 13 is a top plan view showing a portion of a unit of dielectric resonators in accordance with a third embodiment of the present invention.
Figure 14:
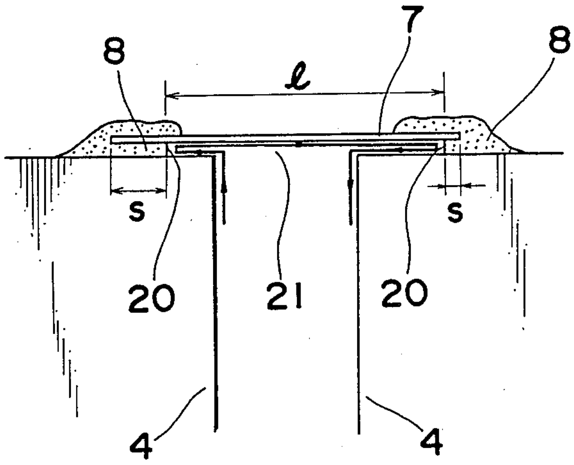
FIG. 14 is a cross-sectional view, taken along a line X—X, of the unit of FIG. 13.

Referring to FIG. 13 and FIG. 14, there is shown a third embodiment of the present invention using the earth plate 5 shown in FIG. 15(*b*). The earth plate 5, which is provided with cuts 6b as the notch portions 6 in both the end edges thereof, is placed on the dielectric resonator 10 so that the cuts 6b project from the end of the case 4 to positively penetrate the solder so far as the end of the case 4 as in the second embodiment. Also, the earth plate 5 is placed on the dielectric resonator 10 before use in such a way that the cuts 6b will not extend to the end of the case 4, as shown in FIG. 13. In this case, the positions of the cuts 6b in the earth plate 5 are arranged in position in a row in a lateral direction and the space l between the notch portions on both the sides may be made constant, whereby the route of the conductive current becomes detour-like, as shown in FIG. 14. In this arrangement solder 8 positively penetrates so far as the recesses of the cuts 6b to make the route length constant, with the impedance being made constant without any dispersion or variation in this manner.

Moreover, by the use of the earth plate 5 with metallic wire rods 5d, as shown in FIG. 15(*d*), being arranged in face form, the solder may penetrate as far as the end of the case 4 as in the second embodiment. Also, an earth plate 5 as shown just FIG. 15(*c*) may be used in as the earth plate 5 of FIG. 15(*b*) is used.

In this embodiment, connection is made, by the earth plate 5, only between the top faces of the cases 4. Another connection may be made similarly, by the earth plate 5, even between the bottom faces of the cases 4 not shown in the drawing. Needless to say, both the side faces may also be completed therebetween by the earth plate 5. Also, in the embodiment, a dielectric resonator of the $TM_{010}$ mode is described, but the present invention can also be carried out in a dielectric resonator of the other modes, such as $TE_{01}\delta$.

According to the present invention, a plurality of dielectric resonators are combined through the conductive plates to readily provide a dielectric filter with the desired number of stages. Variation and dispersion in the impedance between the dielectric resonators may be removed, and the uniformity of the filter characteristics may be ensured, by the route length being made constant, of the conductive current flowing from one dielectric resonator to the other dielectric resonator through the conductive plate. Also, if the conductive plate is thermally expanded or contracted by variation in the temperatures, the conductive plate is deformed to absorb the stresses, preventing the soldered portion from coming off or the conductive plate from being cut off, thus improving the reliability and tolerance of the environment of the dielectric filter.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention unless they depart therefrom.

What is claimed is:

1. A dielectric filter, comprising:

a plurality of resonators, each including a ceramic case which has a pair of openings at both its ends and a conductive film thereon to form an actual current path on the surface of the ceramic case, a dielectric solid body which has the same characteristic of linear expansion coefficient as the ceramic case being mounted and accommodated in the case, a metallic housing in which the plurality of resonators are accommodated in series with each other with a space therebetween, so as to produce a given electromagnetic coupling between each two adjacent resonators as a function of the end opening areas thereof facing each other, the metallic housing also having a pair of input and output terminals, and a conductive plate interconnecting the ceramic cases and having means for lessening thermal expansion and contraction stresses of said conductive plate, so that thermal stresses of expansion and contraction which are generated between the ceramic cases and the metallic housing are eliminated by the conductive plate.

2. A dielectric filter as defined in claim 1, wherein said conductive plate is placed between the adjacent pairs of resonators and soldered to the respective conductive films of the resonators.

3. The dielectric filter as defined in claim 2, wherein said plate has notch portions at the portions thereof that are soldered to the conductive film of the resonators.

4. The dielectric filter as defined in claim 2, wherein said plate comprises a mesh having mesh holes soldered to the conductive film of the resonators.

5. The dielectric filter as defined in claim 2, wherein said plate comprises a sheet-like plate of regular shape soldered to the conductive film of the resonators.

6. The dielectric filter as defined in claim 2, wherein said plate has elongated holes of substantially the same length at the portions thereof that are soldered to the conductive film of the resonators.

7. The dielectric filter as defined in claim 1, wherein said conductive plate comprises a spring plate placed and soldered between each adjacent pair of resonators and is inserted between the resonators and the metallic housing to secure the resonators in the metallic housing.

* * * * *